United States Patent [19]

Watanabe

[11] Patent Number: 5,044,215
[45] Date of Patent: Sep. 3, 1991

[54] TRANSMISSION WITH AN ULTRA LOW SPEED RANGE

[75] Inventor: Tsukasa Watanabe, Hamamatsu, Japan

[73] Assignee: Suzuki Motor Corporation, Shizuoka, Japan

[21] Appl. No.: 648,223

[22] Filed: Jan. 31, 1991

[30] Foreign Application Priority Data

Feb. 28, 1990 [JP] Japan .................................. 2-48197

[51] Int. Cl.$^5$ .............................................. F16H 3/08
[52] U.S. Cl. ........................................ 74/329; 74/331; 74/359
[58] Field of Search ................... 74/329, 331, 359, 361

[56] References Cited

U.S. PATENT DOCUMENTS 5,000,060 3/1991 Reynolds et al. ................. 74/331 X

FOREIGN PATENT DOCUMENTS 62-278339 12/1987 Japan .
63-39450 8/1988 Japan .

Primary Examiner—Dirk Wright
Attorney, Agent, or Firm—Flynn, Thiel, Boutell & Tanis

[57] ABSTRACT

A transmission includes a main shaft and a counter shaft. The gear ratio is changeable in accordance with the engagement between a main shaft gear train mounted on the main shaft and a counter shaft gear train mounted on the counter shaft. A low speed gear mechanism provides an extremely low speed range and includes a low speed shaft provided with a gear train and disposed coaxially with the main shaft. A first changeover sleeve is movable in order to bring the low speed shaft into and out of engagement with the main shaft. A second changeover sleeve is movable for selectively shifting a forward low speed gear train and a reverse low speed gear train into driving engagement between the low speed shaft and the counter shaft.

1 Claim, 4 Drawing Sheets

PROPULSION SHAFT FRONT DIFFERENTIAL MECHANISM

TRANSMISSION WITH AN ULTRA LOW SPEED RANGE

FIELD OF THE INVENTION

This invention relates to a transmission with an ultra low speed range, and particularly to a transmission with an ultra low speed range which is provided with an extremely low speed gear mechanism without adversely affecting the synchronization efficiency.

BACKGROUND OF THE INVENTION

Vehicles are equipped with a transmission adapted to convert power generated by an internal combustion engine and to provide output power in accordance with traveling conditions. There are, for example, gear type transmissions and belt type transmissions. The gear type transmission is widely used because power transmission loss is less.

One example of such transmissions is shown in FIG. 5 wherein the transmission 202 comprises: a main shaft 204 for inputting power from an internal combustion engine (not shown); a main first-speed gear 206, a main reverse gear 208, a main second-speed gear 210, a main third-speed gear 212 and a main fourth-speed gear 214 all functioning as a main gear train arranged in a predetermined way on the main shaft 204; a counter shaft 216 disposed in parallel relation with the main shaft 204; a counter first-speed gear 218, a counter reverse gear 220, a counter second-speed gear 222, a counter third-speed gear 224 and a counter fourth-speed gear 226 all functioning as a counter gear train arranged in a predetermined way on the counter shaft 216; a final reduction drive gear 228 mounted on the counter shaft 216; a final reduction driven gear 232 meshed with the final reduction drive gear 228 and next connected to a differential mechanism 230; a transfer drive gear 238 meshed with the final reduction driven gear 232 and mounted on an intermediate shaft 236 of a transfer mechanism 234; a transfer drive bevel gear 240 mounted on the intermediate shaft 236; a transfer driven bevel gear 244 mounted on a transfer driven pinion shaft 242 in such a manner as to mesh with the transfer drive bevel gear 240; a companion flanged shaft coupler 246 connected to the transfer driven pinion shaft 242; a synchronous meshing mechanism 248 mounted on the counter shaft 216 disposed between the counter third-speed gear 224 and the counter fourth-speed gear 226; and other component elements.

Also, the transmission 202 of FIG. 5 further includes an extremely low speed gear mechanism 250 for reducing the speed to a range even lower than the first-speed gear train comprising the main first-speed gear 206 and the counter first-speed gear 218 as a lowest gear train. The extremely low speed gear mechanism 250 includes a main shaft extremely low speed gear 252 mounted on one end portion of the main shaft 204, a rear extremely low speed idler gear 256 meshed with the gear 252 and mounted on an extremely low speed idler shaft 254, a forward low speed idler gear 258 fixedly connected to the idler gear 256, a main shaft forward low speed idler gear 260 meshed with the forward low speed idler gear 258 and rotatably mounted on the main shaft 204, a counter shaft forward low speed gear 262 meshed with the main shaft forward low speed idler gear 260 and rotatably mounted on the counter shaft 216, a reverse low speed idler gear 264 fixedly connected to the extremely low speed idler gear 256, a counter shaft reverse low speed gear 266 meshed with the reverse low speed idler gear 264 and rotatably mounted on the counter shaft 216, and a forward/reverse shift mechanism 268 rotatably mounted on the counter shaft 216 and axially slidably disposed between the counter shaft forward low speed gear 262 and the counter shaft reverse low speed gear 266.

Examples of known transmissions are disclosed in Japanese Patent Publication No. Sho 63-39450 and Japanese Patent Early Laid-open Publication No. 62-278339. The transmission disclosed in Japanese Patent Publication No. Sho 63-39450 is constructed such that when an extremely low speed gear train is established by a synchronous meshing mechanism, driving force from an input shaft is transmitted to an output shaft at a great reduction ratio via the extremely low speed gear train to obtain an extremely low speed, an intermediate shaft and a secondary shaft being disposed in parallel relation with the input and output shaft axes, a secondary transmission mechanism being juxtaposed to a main transmission mechanism in order to restrain increase of the overall length of the transmission, a secondary shaft and an intermediate shaft of the secondary transmission mechanism each having one end supported on the end wall o a clutch case, whereby the secondary transmission mechanism, as a whole, is disposed in such a manner as to be one-sided to a portion of a transmission case, so that the transmission case is increased in rigidity and formed compact in size.

The transmission described in Japanese Patent Early Laid-open Publication No. Sho 62-278339 is designed such that gears $EL_1$ to $EL_4$ and a synchronous mechanism, which are axially supported in parallel relation with a main shaft and a drive pinion shaft, are disposed in a space where the gear trains of an ordinary transmission are arranged, and therefore, the entirety can be properly laid out without necessity for a large transmission case.

In a transmission, the moment of inertia of parts to be synchronized has a great effect on the synchronization efficiency as a basic efficiency of the transmission.

However, in the transmission 202 shown in FIG. 5, the extremely low speed gear mechanism 250 is directly mounted on the main shaft 204 and as the axes and gears of the extremely low speed gear mechanism 250 are rotated in accordance with rotation of the main shaft 204, the synchronization efficiency is impaired with the increased moment of inertia caused by these parts. Any attempt to increase, for example, the length of the tapered portion where the synchronizer ring of the synchromesh mechanism contacts in order to maintain the synchro efficiency at a favorable level fails to decrease the moment of inertia to a satisfactory extent, thus failing to enhance the synchro efficiency.

Therefore the present invention attempts to obviate the above-mentioned inconveniences by providing, a transmission with an ultra low speed range which is capable of maintaining the synchro efficiency at a favorable level without using a large sized synchromesh mechanism and which can effectively prevent generation of gear rattling sounds by eliminating rotation of the shafts and gears of the extremely low speed gear mechanism when in the neutral position.

According to a preferred embodiment of the present invention, there is provided a transmission with an ultra low speed range in which the transmission gear ratio can be changed in accordance with the meshing state between a main shaft gear train mounted on a main shaft and a counter shaft gear train mounted on a counter shaft and which is provided with an extremely low speed gear mechanism adapted to reduce the speed to a range even lower than the lowest gear train. The transmission comprises an extremely low speed shaft provided with an extremely low speed main gear train of said extremely low speed gear mechanism and disposed coaxially with said main shaft, a first shift mechanism having a first changeover sleeve which is moved in order to bring said extremely low speed shaft into or out of engagement with said main shaft, and a second shift mechanism having a second changeover sleeve which is moved for selectively shifting a forward low speed gear train and a reverse low speed gear train into driving engagement between the extremely low speed shaft and the counter shaft.

According to the construction of the present invention, when in an extremely low speed range, firstly the first changeover sleeve of the first shift mechanism is moved in order to connect the main shaft with the extremely low speed shaft, and because of the fact that the change speed pattern is in a forward position or in a reverse position of the extremely low speed range, the vehicle is moved forwardly or reversely in an extremely low speed range.

On the other hand, as the first changeover sleeve is moved in such a manner as to separate the extremely low speed shaft from the main shaft when in a normal traveling range, the shafts and gears of the extremely low speed gear mechanism are not rotated and, as a result, synchro efficiency can be maintained at a favorable level without increasing the moment of inertia, and generation of gear rattling sound can be effectively prevented when in this neutral position.

BRIEF DESCRIPTION OF THE DRAWINGS

The present invention will be described with reference to the drawings, in which.

DETAILED DESCRIPTION

Figure 1:
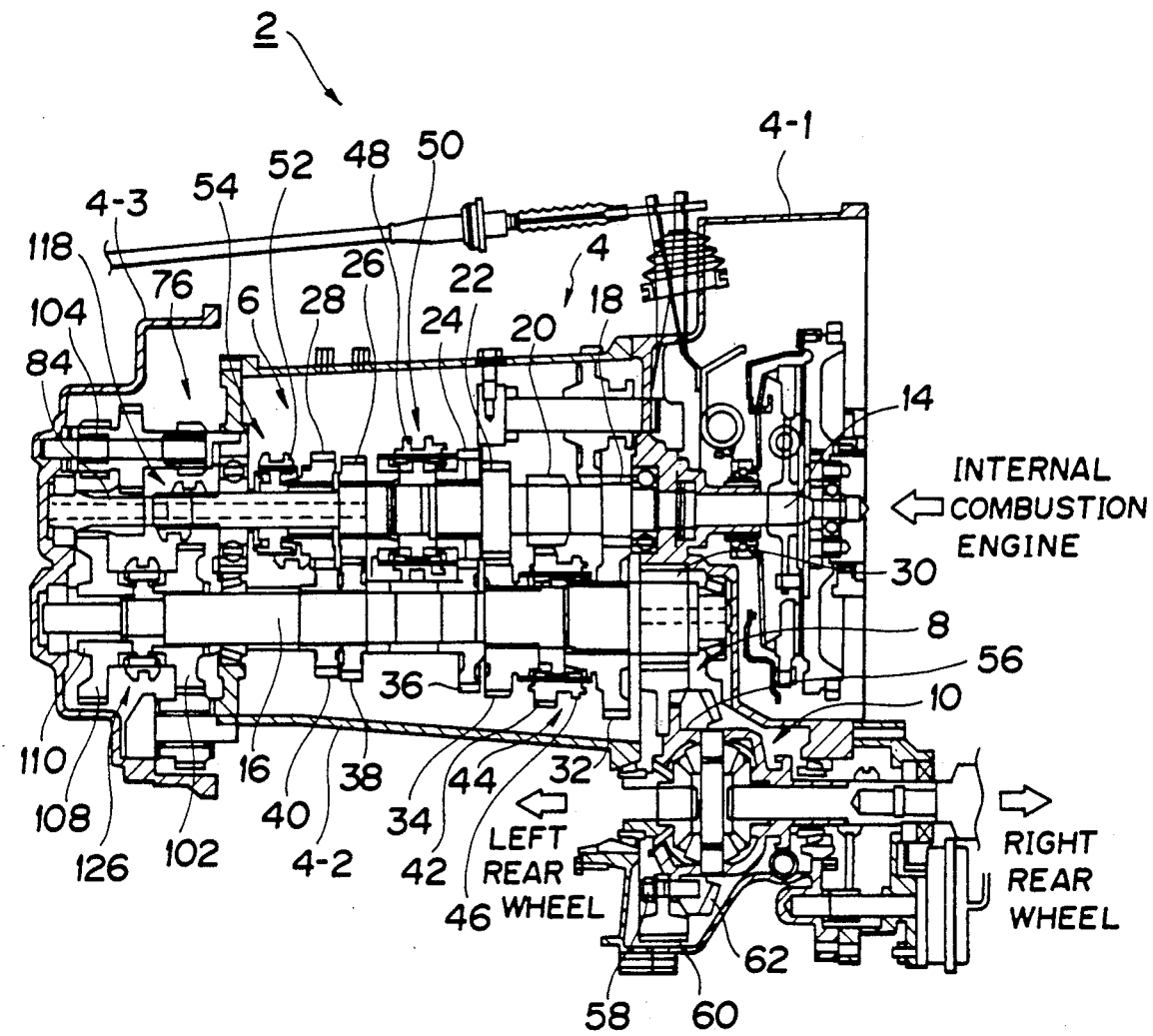
FIG. 1 is a generally sectional view of a transmission according to the present invention.
Figure 2:
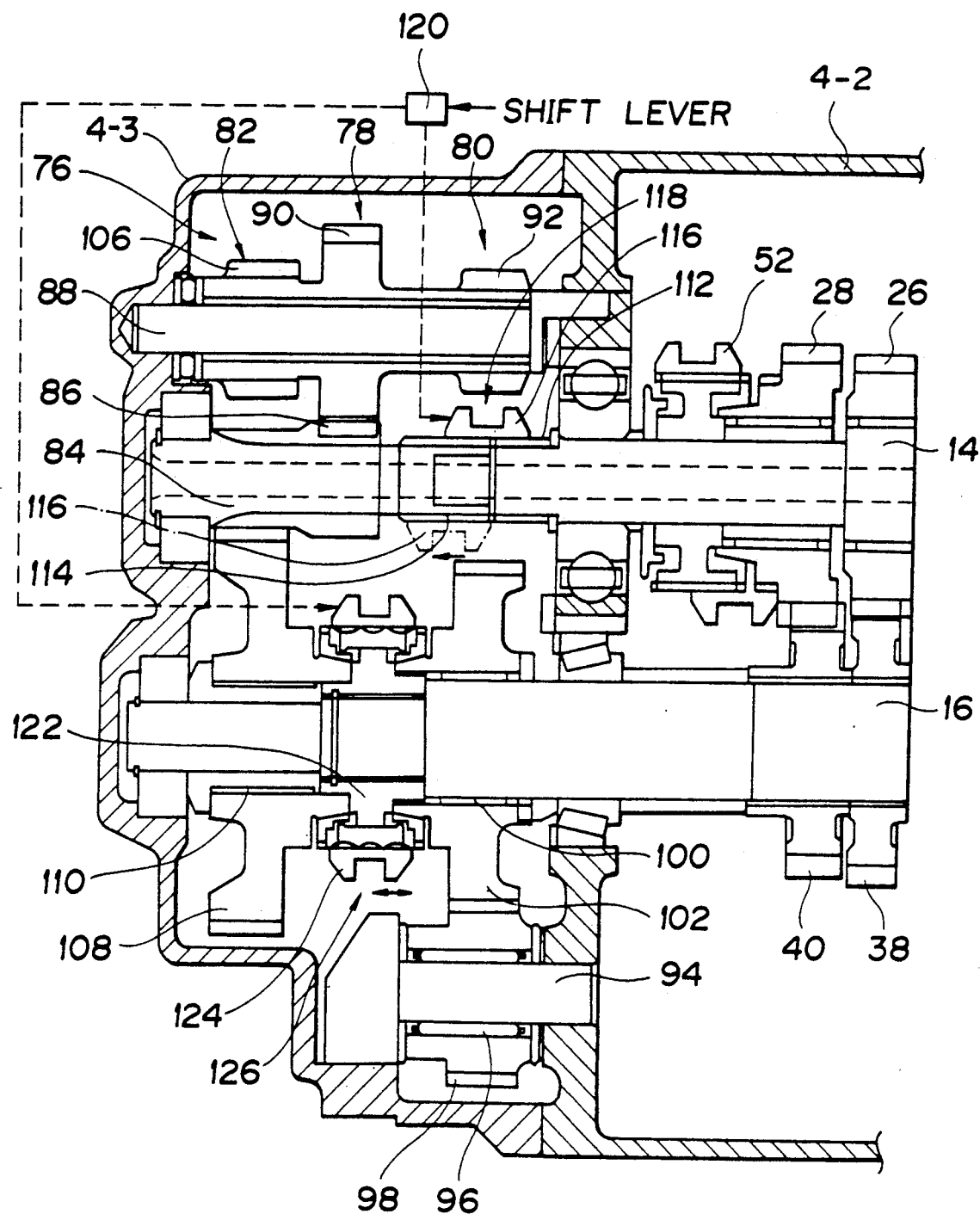
FIG. 2 is an enlarged sectional view of an extremely low speed gear mechanism of the transmission of FIG. 1.
Figure 3:
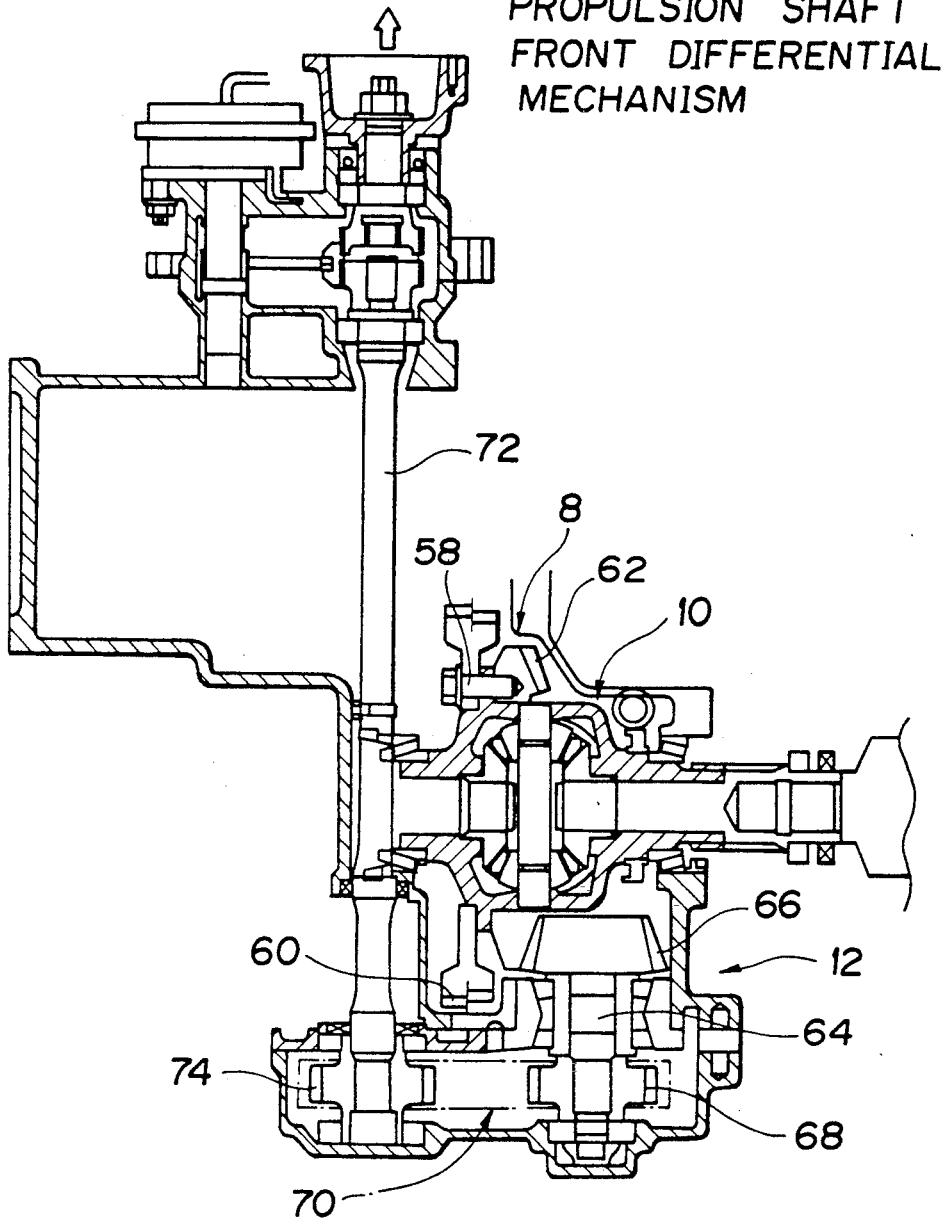
FIG. 3 is a sectional view of a transfer mechanism and a power transmission system according to the present invention.

FIGS. 1 through 4 show one embodiment of the present invention. In the Figures, numeral 2 denotes a horizontal transmission for obtaining an extremely low speed range. The transmission 2 has a gear shifting portion 6 connected with an internal combustion engine (not shown) within the transmission case 4. This gear shifting portion 6, as shown in FIG. 3, is connected with a rear differential mechanism 10 through a final reduction gear mechanism 8, and a transfer mechanism 12 is connected with the rear differential mechanism 10.

In FIG. 1, a main shaft 14 is coupled with an input shaft (not shown) for inputting power from the internal combustion engine side. The main shaft 14 and a counter shaft 16 are disposed in the longitudinal direction of the transmission and in parallel relation within the transmission case 4. The main shaft 14 is rotatably supported by right and left case parts 4-1 and 4-2 of the transmission case 4. The counter shaft 16 is also rotatably supported by the right and left case parts 4-1 and 4-2.

The main shaft 14 is provided with a main first-speed gear 18, a main reverse gear 20 and a main second-speed gear 22, all fixedly mounted thereon, and further with a main third-speed gear 24, a main fourth-speed gear 26 and a main fifth-speed gear 28, all rotatably mounted thereon for rotation relative thereto, all gears being disposed in the aforementioned order away from the internal combustion engine.

The counter shaft 16 is provided with a final reduction drive gear 30 fixedly mounted thereon and forming part of the final reduction gear mechanism 8; a counter first-speed gear 32 with which the main first-speed gear 18 is meshed and a counter second-speed gear 34 with which the main second-speed gear 22 is meshed, these gears 32 and 34 being rotatably mounted on the counter shaft 16 for rotation relative thereto; and further with a counter third-speed gear 36 with which the main third-speed gear 24 is meshed, a counter fourth-speed gear 38 with which the main fourth-speed gear 26 is meshed and a counter fifth-speed gear 40 with which the main fifth-speed gear 28 is meshed, these gears 36, 38 and 40 being fixedly mounted on the counter shaft 16, all being disposed in the aforementioned order away from the internal combustion engine.

A counter reverse gear 42 is mounted on the counter shaft 16 between the counter first-speed gear 32 and the counter second-speed gear 34. A first and second-speed changeover sleeve 46 of a first and second-speed synchronous meshing mechanism 44 is integrally mounted on the counter reverse gear 42. Sleeve 46 is nonrotatably but axially slidably mounted on shaft 16.

And a third and fourth-speed synchronous meshing mechanism 50 having a third and fourth-speed changeover sleeve 48 is nonrotatably but axially slidably mounted on the main shaft 14 between the main third-speed gear 24 and the main fourth-speed gear 26.

Furthermore, a 5-speed synchronous meshing mechanism 54 having a fifth-speed changeover sleeve 52 is non-rotatably but slidably mounted on the main shaft 14 in the vicinity of the main fifth-speed gear 28.

The final reduction drive gear 30 meshes with a final reduction driven gear 60 having a large diameter and fixed to a differential carrier 56 of the rear differential mechanism 10 by a fixing bolt 58. Accordingly, the final reduction gear mechanism 8 comprises the final reduction drive gear 30 and the final reduction driven gear 60.

A transfer bevel gear 62 of the transfer mechanism 12 is fixed to the differential carrier 56 by the fixing bolt 58. The rear differential mechanism 10 is connected with a right wheel and a left wheel of a vehicle (not shown).

Meshed with the transfer bevel gear 62 is a transfer bevel pinion gear 66 mounted on a transfer drive pinion shaft 64 which is disposed in generally perpendicular relation with the main shaft 14 and the counter shaft 16 as shown in FIG. 3. The transfer drive pinion shaft 64 is provided with a drive sprocket 68 and the drive sprocket 68 is provided with a chain 70 looped therearound. Further, the chain 70 is looped around a driven sprocket 74 mounted on an intermediate shaft 72. The intermediate shaft 72 is disposed in generally parallel relation with the transfer drive pinion shaft 64 and is connected to a propulsion shaft (not shown) which is in turn connected to a front differential mechanism (not shown) for driving the front wheels of the vehicle.

Disposed within a side transmission case part 4-3 connected next to the left transmission case part 4-2 is an extremely low speed gear mechanism 76 for obtaining an extremely low speed range as an ultra-low speed range. That is, the mechanism 76 reduces the speed to a range even lower than the lowest gear train (i.e. the main first-speed gear 18 and the counter first-speed gear 32). As is shown in FIG. 2, the extremely low speed gear mechanism 76 comprises an extremely low speed main gear train 78, a forward low speed gear train 80, and a reverse low speed gear train 82. An extremely low speed gear 86 is fixed to an extremely low speed shaft 84 disposed coaxially with the main shaft 14, and an extremely low speed idler gear 90 adapted to mesh with the extremely low speed gear 86 is rotatably supported on an extremely low speed idler shaft 88 disposed in parallel relation with the extremely low speed shaft 84. A forward low speed drive gear 92 of the forward low speed gear train 80 is integrally connected on one side of the extremely low speed idler gear 90. A forward low speed idler gear 98 is rotatably mounted on a forward low speed idler shaft 94 through a first needle bearing 96 and is meshed with the forward low speed drive gear 92. A forward low speed driven gear 102 is rotatably mounted on the counter shaft 16 through a second needle bearing 100 and is meshed with the forward low speed idler gear 98.

Likewise, a reverse low speed drive gear 106 is supported on the extremely low speed idler shaft 88 through a fourth needle bearing 104 (FIG. 1) and is integrally disposed on the other side of the extremely low speed idler gear 90. A reverse low speed driven gear 108 is meshed with the reverse low speed drive gear 106. The reverse low speed driven gear 108 is rotatably mounted on the counter shaft 16 through a fourth needle bearing 110.

Accordingly, in the extremely low speed gear mechanism 76, the extremely low speed gear train 78 comprises the extremely low speed gear 86 and the extremely low speed idler gear 90, the forward low speed gear train 80 comprises the forward low speed drive gear 92, the forward low speed idler gear 98 and the forward low speed driven gear 102, and the reverse low speed gear train 82 comprises the reverse low speed drive gear 106 and the reverse low speed driven gear 108.

The main shaft 14 and the extremely low speed shaft 84 are connected and disconnected by a first shift mechanism 118 having a first changeover sleeve 116 movable in the axial direction in order to engage with and disengage from a spline 112 formed at an end portion of the main shaft 14 and to engage with a spline 114 formed at an end portion of the extremely low speed shaft 84 which is coaxially aligned with the main shaft 14. That is, when the first changeover sleeve 116 is in engagement with both the splines 112 and 114, the main shaft 14 is in rotational driving engagement with the extremely low speed shaft 84 and, on the other hand, when the first changeover sleeve 116 is in engagement with only the spline 114 but not in engagement with the spline 112 (as shown by the one dot chain line in FIG. 2), the extremely low speed shaft 84 is disengaged from the main shaft 14.

The first changeover sleeve 116 is actuated by a sleeve operating mechanism 120 such as an actuator, etc., which is activated by operation of a conventional shift lever (not shown). In the change speed pattern of the shift lever of FIG. 4, the first changeover sleeve 116 is engaged with only the spline 114 in order to disengage the extremely low speed shaft 84 from the main shaft 14 when the shift lever is located in any of the normal shift positions (1, 2, 3, 4, 5, R). On the other hand, the first changeover sleeve 116 is engaged with both the splines 112 and 114 to bring the main shaft 14 into engagement with the extremely low speed shaft 84 when the shift lever is brought to a shift position of an extremely low speed range (indicated at A in FIG. 4). That is to say, in FIG. 4, positions EL and ER of the change speed pattern are displaced sidewardly from the normal shift position, and when the shift lever is moved to the select position A between EL and ER, the sleeve operation mechanism 120 is operated to bring the first changeover sleeve 116 into engagement with both the spline 112 and the spline 114.

Also, a second shift mechanism 126 is mounted on the counter shaft 16 between the forward low speed driven gear 102 and the reverse low speed driven gear 108, and includes a second changeover sleeve 124 which is moved in the axial direction by a hub unit 122 nonrotatably fixed to the counter shaft 16. When moved to engage with the forward low speed driven gear 102, the second changeover sleeve 124 connects the forward low speed driven gear 102 with the counter shaft 16 through the hub unit 122. When moved to engage with the reverse low speed driven gear 108, the second changeover sleeve 124 connects the reverse low speed driven gear 108 with the counter shaft 16 through the hub unit 122. When the second changeover sleeve 124 is brought to a generally intermediate position between the forward low speed driven gear 102 and the reverse low speed driven gear 108, it creates a neutral state for transmitting no power to the counter shaft 16.

This second changeover sleeve 124 is actuated by the first sleeve operation mechanism 120 as in the case of the first changeover sleeve 116. When the shift lever is operated to the EL position of FIG. 4, the second changeover sleeve 124 is moved toward the forward low speed driven gear 102 so as to be engaged therewith. When the shift lever is operated to the ER position of FIG. 4, the second changeover sleeve 124 is moved toward the reverse low speed driven gear 108 so as to be engaged therewith.

The operation of this embodiment will now be described.

Power from the internal combustion engine is transmitted to the main shaft 14 as disposed within the transmission 2. A speed reduction state is properly changed according to necessity in accordance with a meshing state between the main shaft gear train of the main shaft 14 and the counter shaft gear train of the counter shaft 16, and the power is transmitted to the rear wheels from the rear differential mechanism 10 via the reduction gear mechanism 8, and then to the front differential mechanism via the transfer mechanism 12 and the intermediate shaft 72.

Figure 4:
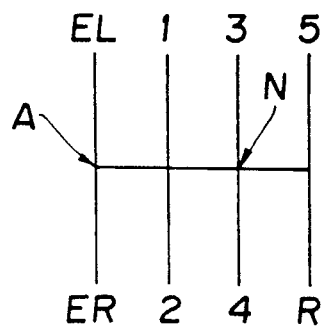
FIG. 4 is an explanatory view of a change speed pattern of a shift lever according to the present invention.
Figure 5:
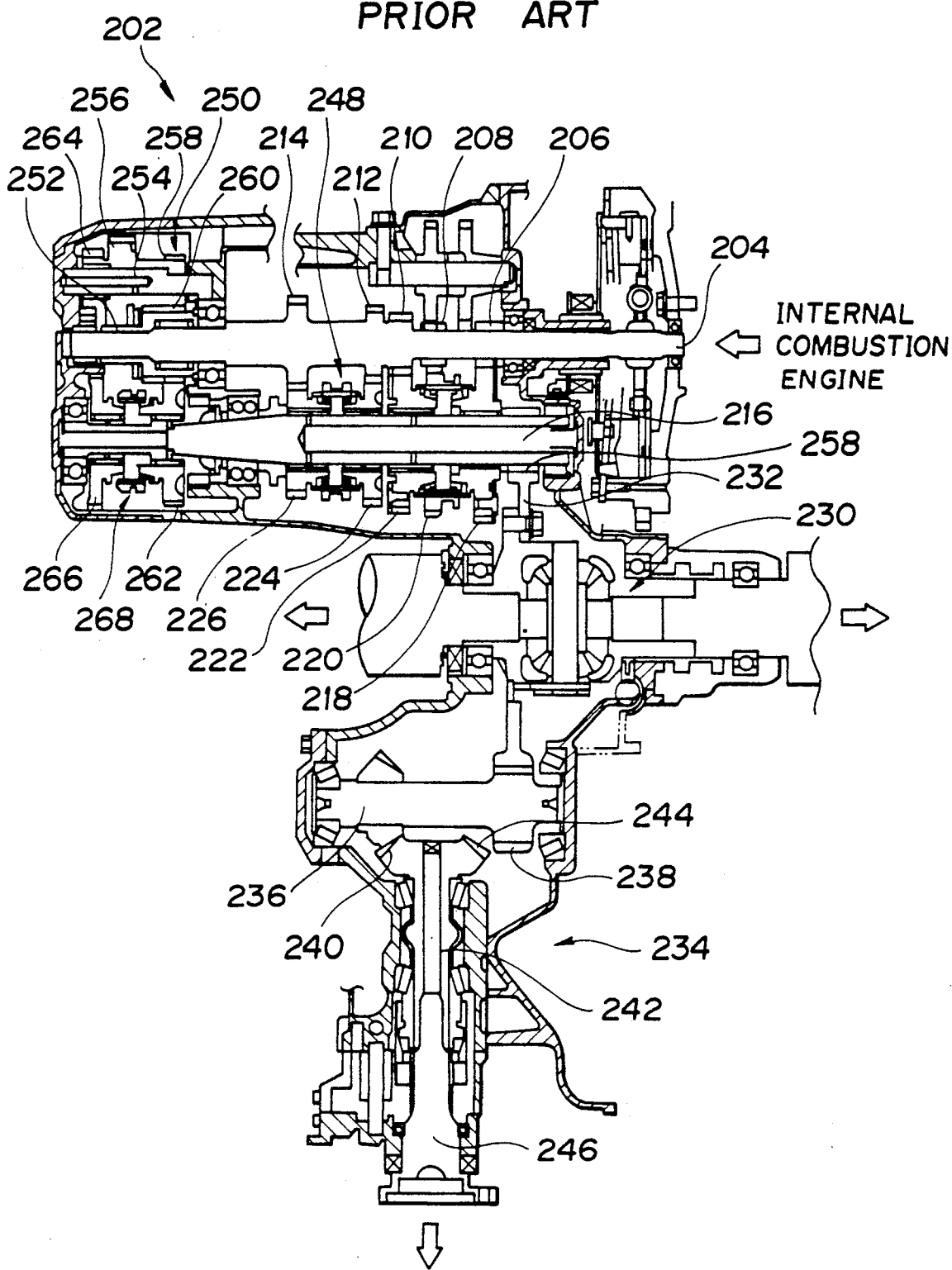
FIG. 5 is a generally sectional view of a conventional transmission.

When the select lever is operated to the select position A in the speed change pattern of FIG. 4 in order to obtain an extremely low speed range, the first changeover sleeve 116 is moved toward the main shaft 14 by the sleeve operation mechanism 120 so as to be engaged with both the splines 112 and 114. As a result, the main shaft 14 and the extremely low speed shaft 84 are connected with each other and the extremely low speed shaft 84 is rotated in accordance with rotation of the main shaft 14. At that time, the second changeover sleeve 124 is located in a generally central position between the forward low speed driven gear 102 and the reverse low speed driven gear 108.

Next, when the shift lever is moved to the EL position of FIG. 4, that is, when the shift lever is operated to achieve a forward movement at an extremely low speed, the second changeover sleeve 124 is moved toward the forward low speed driven gear 102 so as to be engaged therewith. Accordingly, the forward low speed driven gear 102, the hub unit 122 and the counter shaft 16 are rotationally engaged and, as a result, the power of the main shaft 14 is transmitted to the counter shaft 16 via the extremely low speed shaft 84, the extremely low speed gear 86, the forward low speed drive gear 92, the forward low speed idler gear 98, the forward low speed driven gear 102 and the hub unit 122, thereby to obtain a forward extremely low speed range.

On the other hand, when the shift lever is operated to the ER position of FIG. 4, that is, when the shift lever is operated to achieve a reverse movement at an extremely low speed, the second changeover sleeve 124 is moved toward the reverse low speed driven gear 108 side so as to be engaged therewith. Accordingly, the reverse low speed driven gear 108, the hub unit 122 and the counter shaft 16 are rotationally engaged and, as a result, the power of the main shaft 14 is transmitted to the counter shaft 16 via the extremely low speed shaft 84, the extremely low speed gear 86, the reverse low speed drive gear 106, the reverse low speed driven gear 108 and the hub unit 122, thereby to obtain a reverse extremely low speed range.

When the shift lever is operated to the select position A, the second changeover sleeve 124 is brought to a generally intermediate position between the forward low speed driven gear 102 and the reverse low speed driven gear 108 and no power is transmitted to the counter shaft 16, thereby to create a neutral state. In FIG. 4, the reference character N denotes a normal neutral position.

As a result, when the shift lever is located in a normal shift position (1, 2, 3, 4, 5, R), as the first changeover sleeve 116 is already separated from the main shaft 14, the extremely low speed shaft 84, the extremely low speed gear 86, the forward low speed driven gear 102, the reverse low speed driven gear 108 and the forward low speed idler gear 98 of the extremely low speed gear mechanism 76 are not rotated. As a consequence, the moment of inertia is not increased and impairment of the synchronization efficiency can be effectively prevented.

When in the neutral position, because the shafts and gears of the extremely low speed gear mechanism 76 are not rotated, generation of gear rattling sound can be effectively prevented and thus noises can be reduced.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a transmission in which the transmission gear ratio can be changed in accordance with the meshing state between a main shaft gear train mounted on a main shaft and a counter shaft gear train mounted on a counter shaft, the improvement comprising an extremely low speed gear mechanism adapted to reduce the speed to an ultra low range even lower than the lowest gear train among said gear trains, said extremely low speed gear mechanism comprising an extremely low speed shaft provided with an extremely low speed main gear train and disposed coaxially with said main shaft, a first shift mechanism having a first changeover sleeve which is movable in order to bring said extremely low speed shaft into and out of engagement with said main shaft, and a second shift mechanism having a second changeover sleeve which is movable for selectively shifting a forward low speed gear train and a reverse low speed gear train into driving engagement between said extremely low speed shaft and said counter shaft.

* * * * *